H. J. MERRENS.
Mechanism for the Manufacture of Pipes and Tubes from Rubber, Paper, Cloth, &c.
No. 207,884. Patented Sept. 10, 1878.
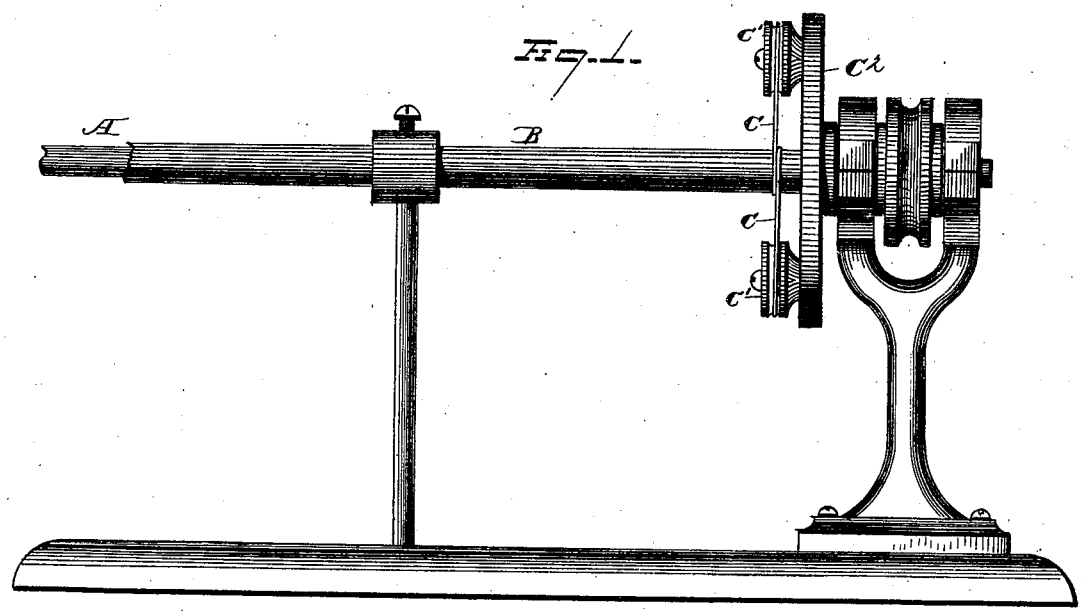
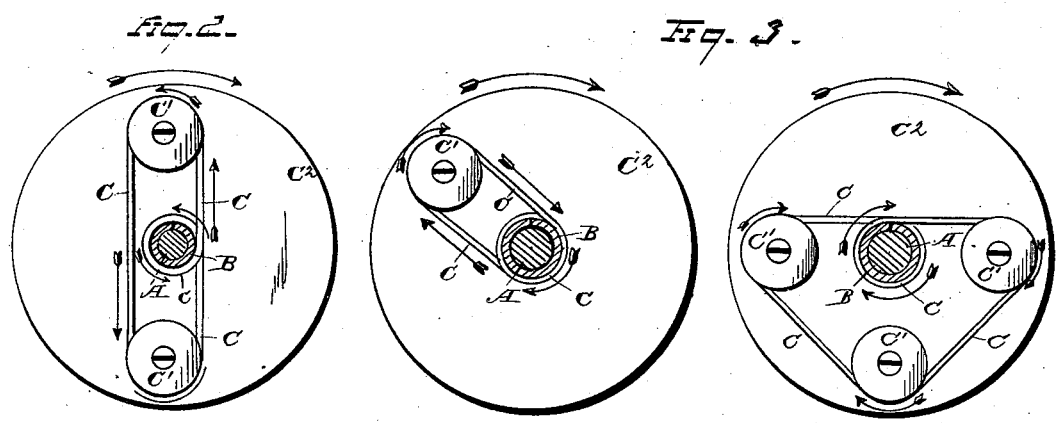

UNITED STATES PATENT OFFICE.

HENRY J. MERRENS, OF CLEVELAND, OHIO.

IMPROVEMENT IN MECHANISMS FOR THE MANUFACTURE OF PIPES AND TUBES FROM RUBBER, PAPER, CLOTH, &c.

Specification forming part of Letters Patent No. 207,884, dated September 10, 1878; application filed July 11, 1878.

*To all whom it may concern:*

Be it known that I, HENRY J. MERRENS, of Cleveland, in the county of Cuyahoga and State of Ohio, have invented certain new and useful Improvements in Mechanisms for Making Pipe or Tubing; and I do hereby declare the following to be a full, clear, and exact description of the invention, such as will enable others skilled in the art to which it pertains to make and use it, reference being had to the accompanying drawings, which form part of this specification.

My invention relates to the manufacture of pipe or tubing, or any cylinder, from rubber, cloth, paper, or any flexible material; and it consists in the combination, with any suitable mechanism, be its character what it may, of an endless belt, band, or cord of any suitable flexible material, arranged so that it shall at all times sufficiently encircle and bear upon the material from which the pipe, cylinder, or tube is to be constructed, so as to form and retain said material in the desired tubular or cylindrical form.

In the drawings, Figure 1 represents one form of my invention in side elevation; Fig. 2, the same in end elevation, and Fig. 3 some of various modifications of my invention.

A represents a mandrel, upon which the ribbon or strip B, from which the pipe or tube is to be made, is formed into cylindrical shape. How this strip or ribbon is primarily shaped and manipulated forms no part of this invention; but after having been more or less wrapped about the mandrel A, then is the time when I prefer to apply my device.

This device consists of an endless belt, C, one or more times passing around the mandrel A, and then passing over one, two, or more pulleys, $C^1$, said pulleys fixed upon revolving arms or plate $C^2$.

I do not limit myself to the number of pulleys $C^1$ to be employed. One will serve a very good purpose; and the belt C will then pass over this one pulley, take one or more turns around the mandrel A, and back again to the pulley.

In Fig. 3 of the drawings is shown this single-pulley form of my device, as well as a three-pulley form.

In operation, the cord or belt C, by being wrapped around the mandrel, and also around the material B, serves to form and maintain said material B in proper cylindrical shape until set or secured in said shape.

In order at all times to keep the belt C from becoming too loose by any stretching or the like, the pulley or pulleys $C^1$ may be made adjustable in such a manner as to set them nearer to or farther from the mandrel A. It matters not what the belt C is made of. It may be of metal—a chain or clock-spring—or any fabric or flexible material.

What I claim is—

In combination with a mandrel or any form, A, upon which a tube, pipe, or cylinder of flexible material is to be shaped, an endless belt, C, and one or more pulleys, $C^1$, arranged to revolve around said mandrel or form A, substantially as shown.

In testimony whereof I have signed my name to this specification in the presence of two subscribing witnesses.

HENRY J. MERRENS.

Witnesses:
    JNO. CROWELL, Jr.,
    W. E. DONNELLY.